United States Patent
Woo et al.

(10) Patent No.: US 11,310,354 B2
(45) Date of Patent: Apr. 19, 2022

(54) FOLDABLE DEVICE AND CONTROLLING METHOD THEREOF

(71) Applicant: Samsung Electronics Co., Ltd., Gyeonggi-do (KR)

(72) Inventors: Kwangtaek Woo, Gyeonggi-do (KR); Deukkyu Oh, Gyeonggi-do (KR); Byoungkug Kim, Gyeonggi-do (KR); Changho Lee, Gyeonggi-do (KR); Jinwan An, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/105,790

(22) Filed: Nov. 27, 2020

(65) Prior Publication Data

US 2021/0160356 A1    May 27, 2021

(30) Foreign Application Priority Data

Nov. 27, 2019    (KR) .......................... 10-2019-0154490

(51) Int. Cl.
*H04B 1/38*    (2015.01)
*H04M 1/02*    (2006.01)

(52) U.S. Cl.
CPC ....... *H04M 1/0245* (2013.01); *H04M 1/0216* (2013.01)

(58) Field of Classification Search
CPC ............. H04M 1/0206; H04M 1/0208; H04M 1/0214; H04M 1/0216; H04M 1/0222;
(Continued)

(56) References Cited

U.S. PATENT DOCUMENTS

| 8,502,788 B2 | 8/2013 | Cho |
| 9,747,067 B2 | 8/2017 | Kim et al. |

(Continued)

FOREIGN PATENT DOCUMENTS

| CN | 109302512 | 2/2019 |
| KR | 20100102473 | 9/2010 |

(Continued)

OTHER PUBLICATIONS

International Search Report dated Mar. 15, 2021 issued in counterpart application No. PCT/KR2020/017077, 7 pages.

*Primary Examiner* — Tuan Pham
(74) *Attorney, Agent, or Firm* — The Farrell Law Firm, P.C.

(57) ABSTRACT

A foldable electronic device is disclosed, the electronic device including a first housing and a second housing adjacent to the first housing; a hinge unit configured to connect the first housing and the second housing; a flexible touch display disposed across the first housing and the second housing; at least one sensor configured to detect an angle formed by the first housing and the second housing; a processor operatively connected with the flexible touch display and the at least one sensor; and a memory operatively connected with the processor, and the memory stores instructions that, when executed, cause the processor to determine whether the first housing and the second housing are in an unfolding state by using the at least one sensor; when the first housing and the second housing are in the unfolding state, set a touch sensitivity of the flexible touch display to a first state; determine a change of the angle formed by the first housing and the second housing by using the at least one sensor; and when the angle is being changed, change the touch sensitivity of the flexible touch display to a second state which is lower than the first state.

16 Claims, 14 Drawing Sheets

(58) Field of Classification Search
CPC . H04M 1/0243; H04M 1/0245; H04M 1/0268
See application file for complete search history.

(56) References Cited

U.S. PATENT DOCUMENTS

| | | | |
|---|---|---|---|
| 9,971,712 B2* | 5/2018 | Oh | G06F 3/04883 |
| 10,254,863 B2 | 4/2019 | Shin et al. | |
| 2010/0117975 A1 | 5/2010 | Cho | |
| 2013/0222286 A1 | 8/2013 | Kang et al. | |
| 2015/0185968 A1 | 7/2015 | Kim et al. | |
| 2018/0255219 A1 | 9/2018 | Ramaprakash et al. | |
| 2019/0138179 A1 | 5/2019 | Xia | |
| 2019/0146629 A1* | 5/2019 | Moon | H04B 1/3888 |
| | | | 345/174 |
| 2019/0226757 A1* | 7/2019 | Park | H03K 17/962 |

FOREIGN PATENT DOCUMENTS

| | | |
|---|---|---|
| KR | 101403025 | 6/2014 |
| KR | 1020140115226 | 9/2014 |

\* cited by examiner

FOLDABLE DEVICE AND CONTROLLING METHOD THEREOF

CROSS-REFERENCE TO RELATED APPLICATION(S)

This application is based on and claims priority under 35 U.S.C. § 119 to Korean Patent Application No. 10-2019-0154490, filed on Nov. 27, 2019, in the Korean Intellectual Property Office, the disclosure of which is incorporated herein by reference in its entirety.

BACKGROUND

1. Field

The present disclosure generally relates to a foldable electronic device, and more particularly, to a method for controlling a touch sensitivity of a display of a foldable device in response to a folding or unfolding operation of the foldable device.

2. Description of Related Art

With the development of display technology, various display devices such as flexible displays and the like are being developed. Due to recent developments, users are now able to use foldable devices including flexible displays. Users may use foldable devices including such flexible displays in a folded state or an unfolded state according to circumstances.

A foldable device may include a plurality of displays or a display of a large screen. When users use the foldable device, they may frequently perform a folding or unfolding operation while touching the display. When a user performs a folding or unfolding operation while touching the display, an event that the user does not intend may occur. Accordingly, there is a need for technology for preventing occurrence of an unintended event when the user performs the folding or unfolding operation while touching the display of the foldable device.

SUMMARY

Various embodiments disclosed in the disclosure may provide an apparatus and a method for solving the above-described problems and may provide the advantages described below.

A foldable electronic device according to an embodiment may include a first housing and a second housing adjacent to the first housing; a hinge unit configured to connect the first housing and the second housing; a flexible touch display disposed across the first housing and the second housing; at least one sensor configured to detect an angle formed by the first housing and the second housing; a processor operatively connected with the flexible touch display and the at least one sensor; and a memory operatively connected with the processor, the memory may store instructions that, when executed, cause the processor to determine whether the first housing and the second housing are in an unfolding state by using the at least one sensor; in the unfolding state, set a touch sensitivity of the flexible touch display to a first state; determine a change of the angle formed by the first housing and the second housing by using the at least one sensor; and, while the angle is being changed, change the touch sensitivity of the flexible touch display to a second state which is lower than the first state.

In addition, a method for controlling of a foldable electronic device according to an embodiment may include determining, by a processor, whether a first housing and a second housing are in an unfolding state by using at least one sensor of the foldable electronic device; in the unfolding state, setting, by the processor, a touch sensitivity of a flexible touch display to a first state; determining, by the processor, a change of the angle formed by the first housing and the second housing by using the at least one sensor; and, while the angle is being changed, changing, by the processor, the touch sensitivity of the flexible touch display to a second state which is lower than the first state.

In addition, a non-transitory recording medium which stores computable-readable instructions according to an embodiment is a recording medium in which, when executed by at least one processor of a foldable electronic device in which the instructions are stored, the instructions are configured to perform determining, by the processor, whether a first housing and a second housing are in an unfolding state by using at least one sensor of the foldable electronic device; in the unfolding state, setting, by the processor, a touch sensitivity of a flexible touch display to a first state; determining, by the processor, a change of the angle formed by the first housing and the second housing by using the at least one sensor; and, while the angle is being changed, changing, by the processor, the touch sensitivity of the flexible touch display to a second state which is lower than the first state.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to the accompanying drawings. It should be appreciated that various embodiments are not intended to limit the technological features set forth herein to particular embodiments, and include various modifications, equivalents, and/or alternatives of embodiments of the disclosure.

Figure 1:
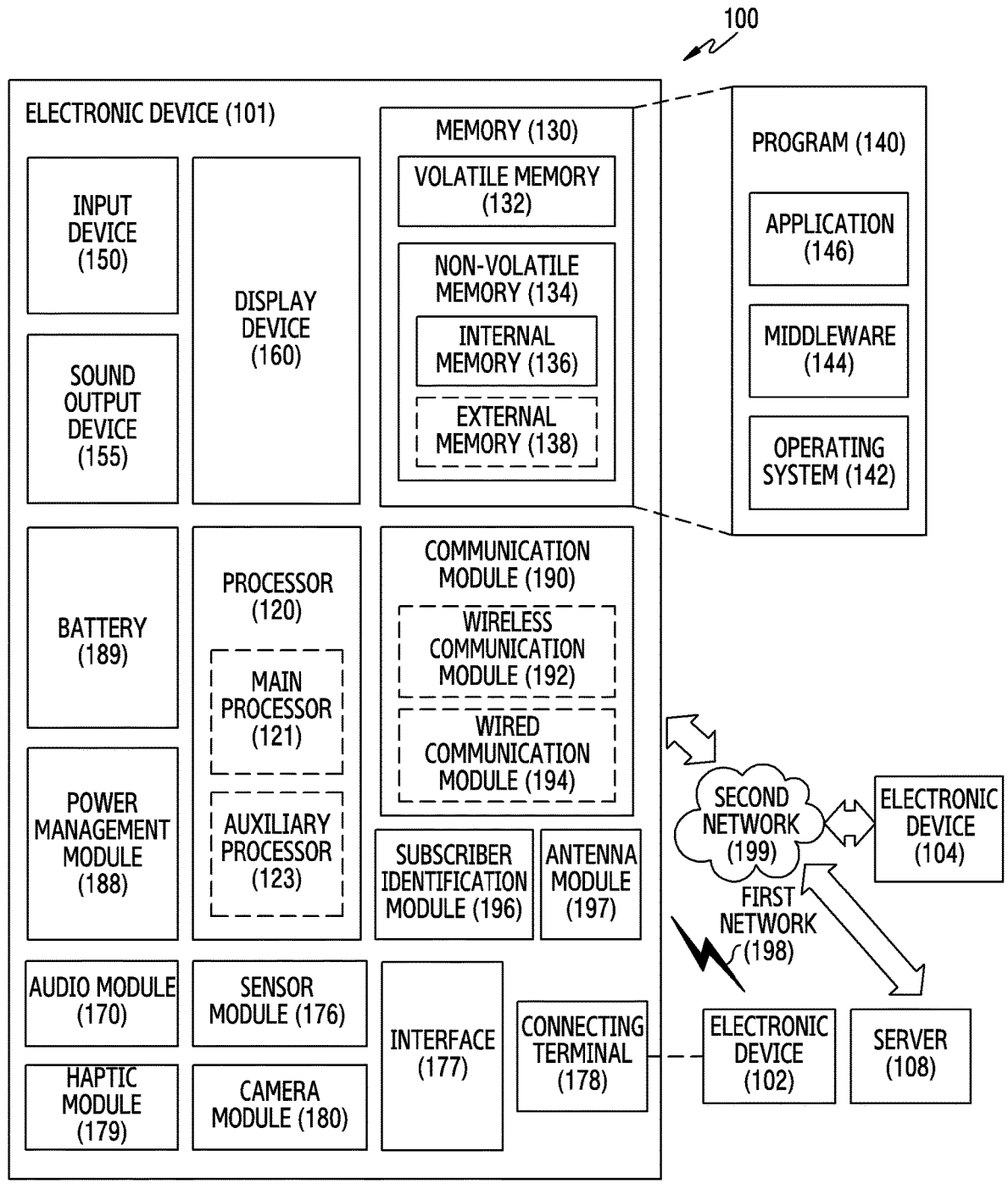
FIG. 1 is a block diagram of an electronic device 101 in a network environment 100, according to an embodiment.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computations. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
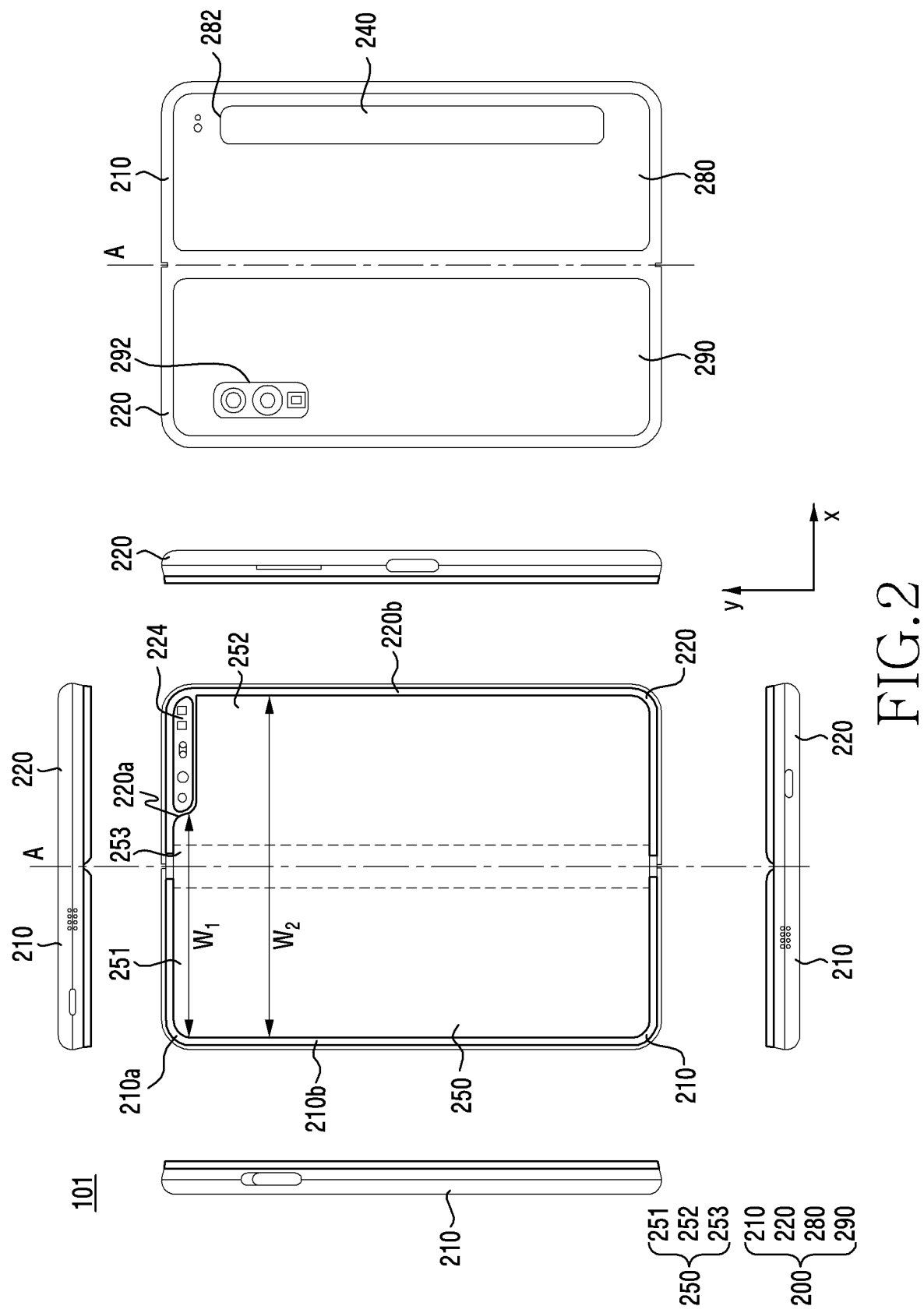
FIG. 2 illustrates a flat state of the electronic device 101 according to an embodiment.

FIG. 2 illustrates a flat state of an electronic device 101, according to an embodiment.

Figure 3:
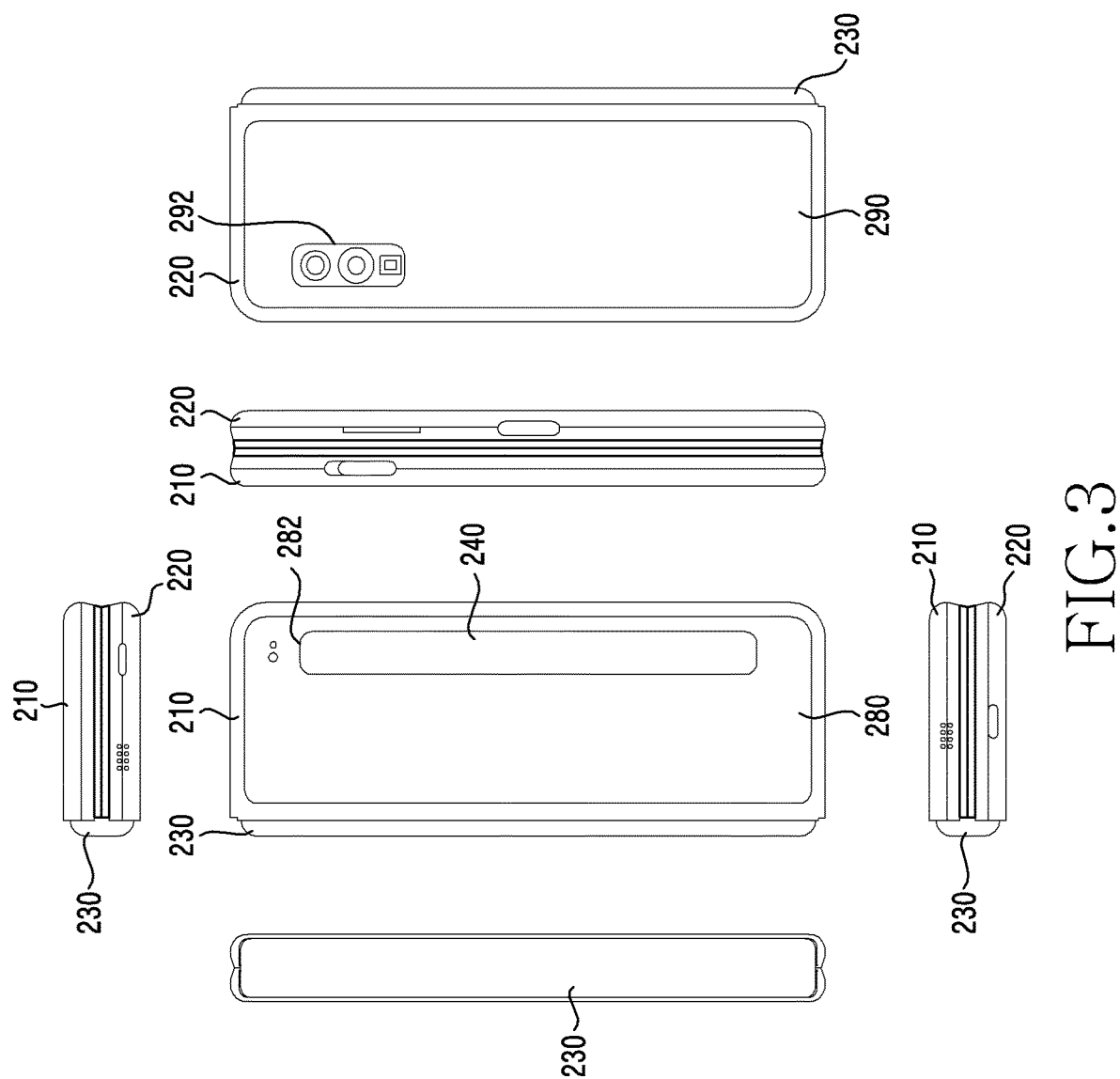
FIG. 3 illustrates a folded state of the electronic device 101, according to an embodiment.

FIG. 3 illustrates a folded state of the electronic device 101, according to an embodiment.

Referring to FIGS. 2 and 3, the electronic device 101 may include a foldable housing 200, a hinge cover 230 to cover a foldable portion of the foldable housing 200, and a flexible or foldable display 250 (hereinafter, display 250) disposed in a space formed by the foldable housing 200. In the disclosure, a surface on which the display 250 is disposed is defined as a first surface or a front surface of the electronic device 101. In addition, the opposite surface of the front surface is defined as a second surface or a rear surface of the electronic device 101. In addition, a surface surrounding a space between the front surface and the rear surface is defined as a third surface or a side surface of the electronic device 101.

The foldable housing 200 may include a first housing structure 210 (hereinafter, first housing 210), a second housing structure 220 (hereinafter, second housing 220) including a sensor area 224, a first rear cover 280, and a second rear cover 290. The foldable housing 200 of the electronic device 101 is not limited to FIG. 2 and the shape and coupling shown in FIG. 2, and may be implemented by a combination and/or coupling of other shapes or components. For example, in another embodiment, the first housing 210 and the first rear cover 280 may be integrally formed with each other, and the second housing 220 and the second rear cover 290 may be integrally formed with each other.

In the illustrated embodiment, the first housing 210 and the second housing 220 may be disposed on both sides with reference to a folding axis (A axis), and may have a substantially symmetric shape with respect to the folding axis A. As will be described, the first housing 210 and the second housing 220 may have a different angle or distance formed therebetween according to whether the electronic device 101 is in a flat state, a folded state, or an intermediate state. In the illustrated embodiment, the second housing 220 may additionally include the sensor area 224 where various sensors are disposed, unlike the first housing 210, but may have a symmetric shape on the other area.

As shown in FIG. 2, the first housing 210 and the second housing 220 may form a recess to accommodate the display 250. The recess may have two or more different widths in a direction perpendicular to the folding axis A due to the presence of the sensor area 224.

For example, the recess may include (1) a first width w1 between a first portion 210a of the first housing 210 which is parallel to the folding axis A and a first portion 220a that is formed on a periphery of the sensor area 224 of the second housing 220, and (2) a second width w2 formed by a second portion 210b of the first housing 210 and a second portion 220b that does not correspond to the sensor area 224 of the second housing 220 and is parallel to the folding axis A. In this case, the second width w2 may be formed longer than the first width w1. In other words, the first portion 210a of the first housing 210 and the first portion 220a of the second housing 220 which have a mutually asymmetric shape may form the first width w1 of the recess, and the second portion 210b of the first housing 210 and the second portion 220b of the second housing 220 which have a mutually symmetric shape may form the second width w2 of the recess. The first portion 220a and the second portion 220b of the second housing 220 may have different distances from the folding axis A. The widths of the recess are not limited to the illustrated embodiment. In various embodiments, the recess may have a plurality of widths according to a shape of the sensor area 224 or portions of the first housing 210 and the second housing 220 that have an asymmetric shape.

At least a portion of the first housing 210 and the second housing 220 may be formed with a metallic material or a nonmetallic material having a rigidity selected to support the display 250.

The sensor area 224 may be formed to have a predetermined area adjacent to one corner of the second housing 220. Disposal, shape, and size of the sensor area 224 are not limited to the illustrated embodiment. For example, in another embodiment, the sensor area 224 may be provided on another corner of the second housing 220 or a certain area between an upper corner and a lower corner. Components embedded in the electronic device 101 to perform various functions may be exposed to the front surface of the electronic device 101 through the sensor area 224 or one or more openings provided on the sensor area 224. The components may include various kinds of sensors. For example, the sensors may include at least one of a front-facing camera, a receiver, or a proximity sensor.

The first rear cover 280 may be disposed on one side of the folding axis on the rear surface of the electronic device 101, and may have, for example, a substantially rectangular periphery, and the periphery may be surrounded by the first housing 210. Similarly, the second rear cover 290 may be disposed on the other side of the folding axis on the rear surface of the electronic device 101, and may have its periphery surrounded by the second housing 220.

In the illustrated embodiment, the first rear cover 280 and the second rear cover 290 may have a substantially symmetric shape with reference to the folding axis (A axis). However, the first rear cover 280 and the second rear cover 290 do not necessarily have the mutually asymmetric shape, and in another embodiment, the electronic device 101 may include the first rear cover 280 and the second rear cover 290 in various shapes. In still another embodiment, the first rear cover 280 may be integrally formed with the first housing 210, and the second rear cover 290 may be integrally formed with the second housing 220.

The first rear cover 280, the second rear cover 290, the first housing 210, and the second housing 220 may form a space to have various components (for example, a printed circuit board or a battery) of the electronic device 101 disposed therein. One or more components may be disposed on the rear surface of the electronic device 101 or may be visually exposed. For example, at least a portion of a sub display 240 may be visually exposed through a first rear surface area 282 of the first rear cover 280. In another embodiment, one or more components or sensors may be visually exposed through a second rear surface area 292 of the second rear surface 290. In various embodiments, the sensor may include a proximity sensor and/or a rear facing camera.

Referring to FIG. 3, the hinge cover 230 may be disposed between the first housing 210 and the second housing 220, and may be configured to hide inner components (for example, a hinge structure). The hinge cover 230 may be hidden by a portion of the first housing 210 and the second housing 220 or may be exposed to the outside according to a state (a flat state or a folded state) of the electronic device 101.

For example, when the electronic device 101 is in the flat state as shown in FIG. 2, the hinge cover 230 may be hidden by the first housing 210 and the second housing 220 and may not be exposed. In another example, when the electronic device 101 is in the folded state (for example, a fully folded state) as shown in FIG. 3, the hinge cover 230 may be exposed to the outside between the first housing 210 and the second housing 220. In a further example, when the electronic device 101 is in an intermediate state where the first housing 210 and the second housing 220 are folded at a certain angle, the hinge cover 230 may be exposed to the outside between the first housing 210 and the second housing 220 at least in part. However, in this case, an exposed area may be smaller than in the completely folded state. In an embodiment, the hinge cover 230 may include a curved surface.

The display 250 may be disposed on a space formed by the foldable housing 200. For example, the display 250 may be seated on the recess formed by the foldable housing 200, and may form most of the front surface of the electronic device 101.

Accordingly, the front surface of the electronic device 101 may include the display 250, and some areas of the first housing 210 and some areas of the second housing 220 which are adjacent to the display 250. In addition, the rear surface of the electronic device 101 may include the first rear cover 280, some areas of the first housing 210 adjacent to the first rear cover 280, the second rear cover 290, and some areas of the second housing 220 adjacent to the second rear cover 290.

The display 250 may refer to a display that has at least a portion deformed into a flat surface or a curved surface. The display 250 may include a folding area 253, a first display area 251 disposed on one side (left side of the folding area 253 shown in FIG. 2) with reference to the folding area 253, and a second display area 252 disposed on the other side (the right side of the folding area 253 shown in FIG. 2).

Dividing the area of the display 250 as shown in FIG. 2 is merely an example, and the display 250 may be divided into a plurality of areas (for example, four or two areas) according to a structure or a function of the display 250. For example, the area of the display 250 may be divided by the folding area 253 extended in parallel with the y-axis or the folding axis (A axis) in the embodiment of FIG. 2, but the display 250 in another embodiment may be divided into areas with reference to another folding area (for example, a folding area parallel to the x-axis) or another folding axis (for example, a folding axis parallel to the x-axis).

The first display area 251 and the second display area 252 may have a substantially symmetric shape with reference to the folding area 253. However, the second display area 252 may include a notch cut according to the presence of the sensor area 224 unlike the first display area 251, but may have a symmetric shape with the first display area 251 on the other area. In other words, the first display 251 and the second display area 252 may include portions symmetrical to each other and portions asymmetrical to each other.

Hereinafter, operations of the first housing 210 and the second housing 220 and respective areas of the display 250 according to a state (for example, a flat state and a folded state) of the electronic device 101 will be described.

In an embodiment, when the electronic device 101 is in the flat state (for example, FIG. 2), the first housing 210 and the second housing 220 may be disposed to form the angle of 180 degrees and to face in the same direction. A surface of the first display area 251 of the display 250 and a surface of the second display area 252 may form 180 degrees each other, and may face in the same direction (for example, a front facing direction of the electronic device). The folding area 253 may be coplanar with the first display area 251 and the second display area 252.

When the electronic device 101 is in the folded state (for example, FIG. 3), the first housing 210 and the second housing 220 may be disposed to face each other. The surface of the first display area 251 of the display 250 and the surface of the second display area 252 may face each other while forming a narrow angle (for example, an angle between 0 and 10 degrees. The folding area 253 may be formed to have at least a portion curved to have a predetermined curvature.

In an embodiment, when the electronic device 101 is in the intermediate state (for example, FIG. 3), the first housing 210 and the second housing 220 may be disposed with a predetermined angle therebetween. The surface of the first display area 251 of the display 250 and the surface of the second display area 252 may form an angle larger than in the folded state and smaller than in the flat state. The folding area 253 may be formed to have at least a portion curved to have a predetermined curvature, and in this case, the curvature may be smaller than in the folded state.

Figure 4:
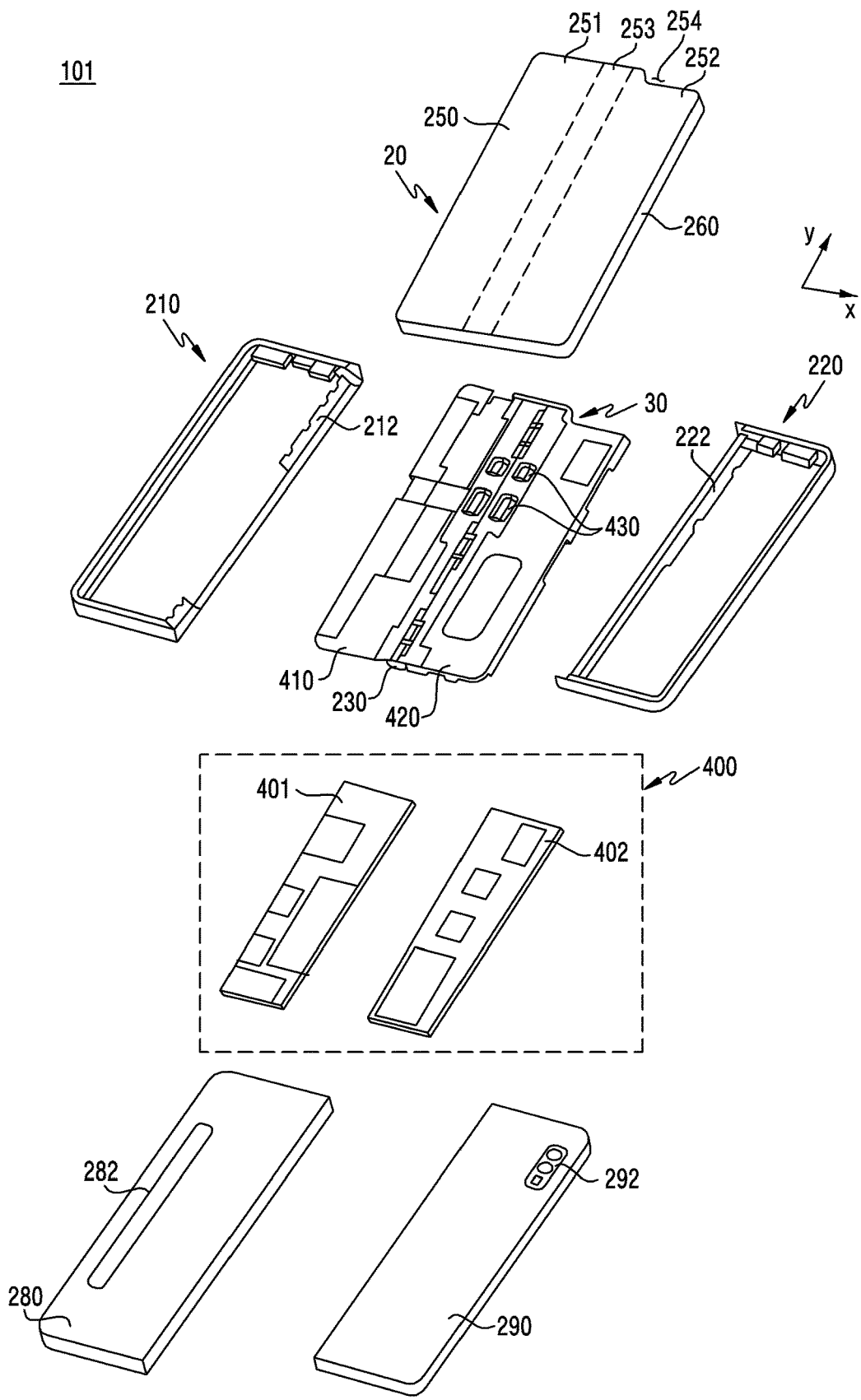
FIG. 4 is an exploded perspective view of the electronic device 101, according to an embodiment.

FIG. 4 is an exploded perspective view of the electronic device 101, according to an embodiment.

Referring to FIG. 4, the electronic device 101 may include a display unit 20, a bracket assembly 30, a substrate unit 400, a first housing 210, a second housing 220, a first rear cover 280, and a second rear cover 290. In the disclosure, the display unit 20 may be referred to as a display module or a display assembly.

The display unit 20 may include a display 250 and one or more plates or layers 260 on which the display 250 is seated. In an embodiment, the plate 260 may be disposed between the display 250 and the bracket assembly 30. The display 250 may be disposed on at least a portion of one surface (for example, an upper surface with reference to FIG. 4) of the plate 260. The plate 260 may be formed to have a shape corresponding to the display 250. For example, a portion of the plate 260 may be formed to have a shape corresponding to a notch 254 of the display 250.

The bracket assembly 30 may include a first bracket 410, a second bracket 420, a hinge structure (or a hinge portion) disposed between the first bracket 410 and the second bracket 420, a hinge cover 230 covering the hinge structure when viewed from the outside, and a wire member 430 (for example, a flexible printed circuit (FPC)) disposed across the first bracket 410 and the second bracket 420.

The bracket assembly 30 may be disposed between the plate 260 and the substrate unit 400. For example, the first bracket 410 may be disposed between a first display area 251 of the display 250 and a first substrate 401. The second bracket 420 may be disposed between a second display area 252 of the display 250 and a second substrate 402.

The wire member 430 and at least a portion of the hinge structure may be disposed inside the bracket assembly 30. The wire member 430 may be disposed in a direction (for example, an x-axis direction) crossing the first bracket 410 and the second bracket 420. The wire member 430 may be disposed in a direction (for example, the x-axis direction) perpendicular to a folding axis (for example, the y-axis or the folding axis A of FIG. 2) of the folding area 253 of the electronic device 101.

The substrate unit 400 may include the first substrate 401 disposed on the side of the first bracket 410 and the second substrate 402 disposed on the side of the second bracket 420, as mentioned above. The first substrate 401 and the second substrate 402 may be disposed inside a space formed by the bracket assembly 30, the first housing 210, the second housing 220, the first rear cover 280, and the second rear cover 290. The first substrate 401 and the second substrate 402 may have components mounted thereon to implement various functions of the electronic device 101.

The first housing 210 and the second housing 220 may be assembled with each other to be coupled to both sides of the bracket assembly 30 with the display unit 20 being coupled to the bracket assembly 30. As will be described below, the first housing 210 and the second housing 220 may slide from both sides of the bracket assembly 30 and may be coupled with the bracket assembly 30.

The first housing 210 may include a first rotation support surface 212, and the second housing 220 may include a second rotation support surface 222 corresponding to the first rotation support surface 212. The first rotation support surface 212 and the second rotation support surface 222 may include a curved surface corresponding to the curved surface included in the hinge cover 230.

The first rotation support surface 212 and the second rotation support surface 222 may cover the hinge cover 230 when the electronic device 101 is in the flat state (for example, the electronic device of FIG. 2), such that the hinge cover 230 is not exposed to the rear surface of the electronic device 101 or is minimally exposed. When the electronic device 101 is in the folded state (for example, the electronic device of FIG. 3), the first rotation support surface 212 and the second rotation support surface 222 rotate along the curved surface included in the hinge cover 230, such that the hinge cover 230 is exposed to the rear surface of the electronic device 101 to the maximum.

Figure 5:
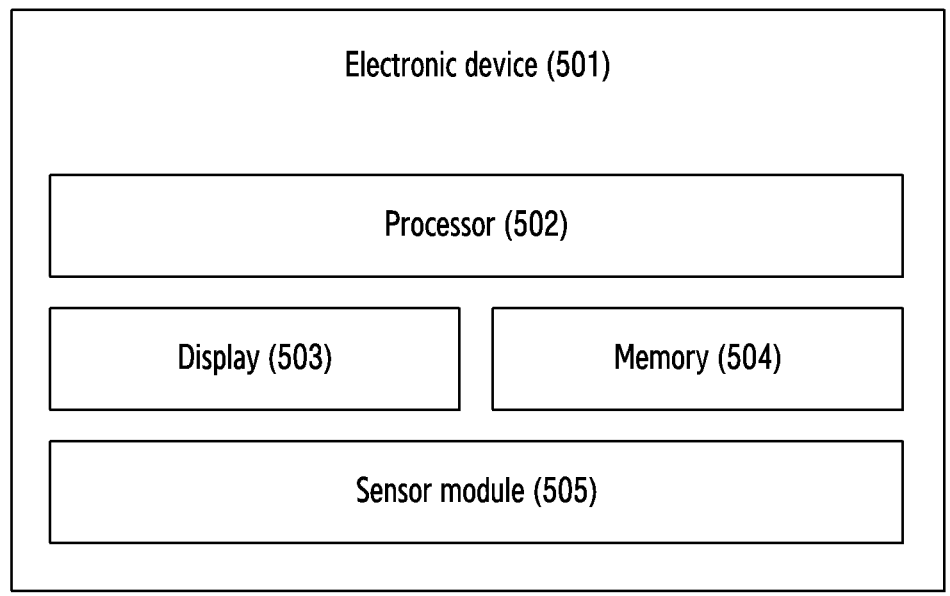
FIG. 5 is a block diagram of an electronic device 501, according to an embodiment.

FIG. 5 is a block diagram of an electronic device 501, according to an embodiment. Details regarding the block diagram of the electronic device 101 may be applied to the electronic device 501.

The electronic device 501 may include a processor 502, a display 503, a memory 504, and a sensor module 505. The processor 502 may be electrically or operatively connected with the display 503, the memory 504, and the sensor module 505. The processor 502 may execute software to control at least one component (for example, the display 503, the memory 504, the sensor module 505, a hinge unit (as described below)) connected to the processor 502, and may perform various data processes and computations. The processor 502 may adjust a touch sensitivity of the display 503 based on a touch input. The processor 502 may store a command or data received from the at least one component in the memory 504, may process a command or data stored in the memory 504, and may store resulting data of processing in the memory 504.

The display 503 may include a foldable or flexible touch display. The display 503 may visually provide information of the electronic device 501. The display 503 may also include a touch circuitry, and may detect a touch input for receiving a command or data to be used for a component (for example, the processor 502) of the electronic device 501. The electronic device 501 may include a sensor circuit (for example, a pressure sensor) set to measure a strength of a force generated by the touch input.

The memory 504 may store various data used by at least one component (for example, the processor 502, the display 503, the sensor module 505, or the hinge unit) of the electronic device 501. The data may include software and input data or output data regarding a command related to the software. The memory 504 may include a volatile memory or a nonvolatile memory.

The sensor module 505 may include at least one sensor, for example, at least one of a gyro sensor, an angle sensor, a Hall sensor, or an acceleration sensor. The at least one sensor may be positioned in at least one of the first housing 210, the second housing 220, or the hinge portion. The processor 502 may determine a change of an angle formed by the first housing 210 and the second housing 220 by using the at least one sensor.

The gyro sensor may detect a slope formed by the first housing 210 and the second housing 220. The processor 502 may determine the change of the angle formed by the first housing 210 and the second housing 220 by using the slope detected by the gyro sensor.

The angle sensor may detect the angle formed by the first housing 210 and the second housing 220. The processor 502 may determine the change of the angle formed by the first housing 210 and the second housing 220 by using the angle detected by the angle sensor.

The acceleration sensor may detect an acceleration of the first housing 210 and/or the second housing 220. The acceleration sensor may process information on the x-axis, y-axis, and z-axis of the first housing 210 and the second housing 220. The processor 502 may determine the change of the angle formed by the first housing 210 and the second housing 220, by using the information processed by the acceleration sensor.

A Hall sensor may detect a direction and a size of a magnetic field caused by a location change of the first housing 210 and the second housing 220. The electronic device 501 may determine whether the angle formed by the first housing 210 and the second housing 220 is changed, by using the direction and the size of the magnetic field detected.

Figure 6:
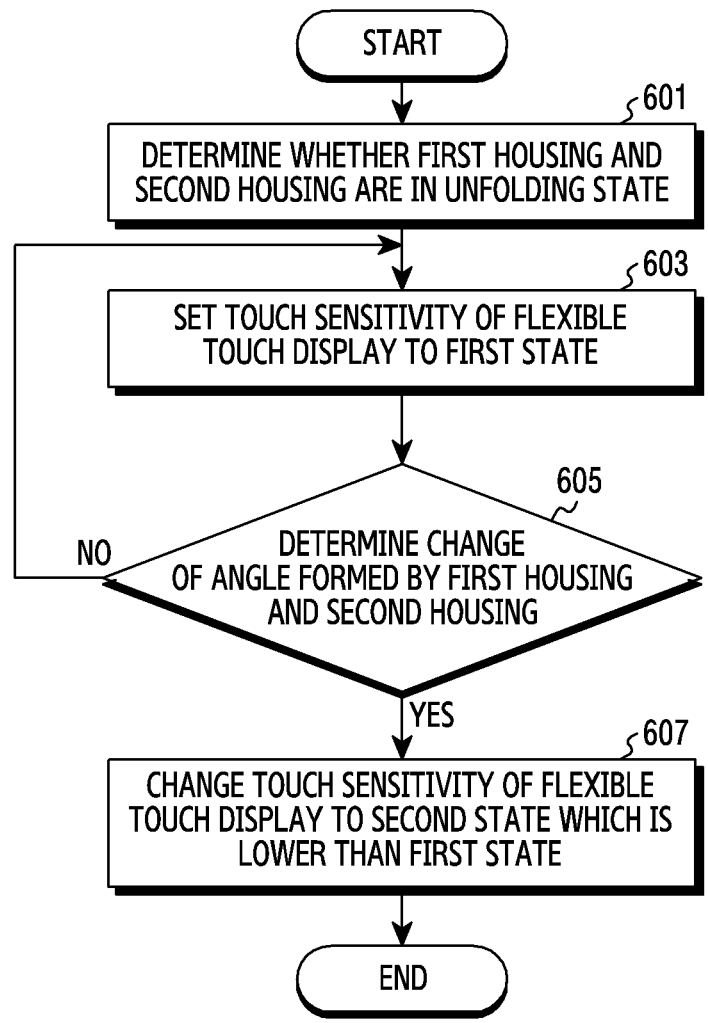
FIG. 6 is a flowchart of a process of changing a touch sensitivity from a first state to a second state according to a change of an angle formed by a first housing and a second housing of an electronic device, according to an embodiment.

FIG. 6 is a flowchart of a process of changing a touch sensitivity from a first state to a second state according to a change of an angle formed by the first housing and the second housing of the electronic device according to an embodiment.

Hereinafter, an operation of the processor 502 changing a touch sensitivity of the display 503 according to a change of an angle formed by the first housing 210 and the second housing 220 of the electronic device 501 will be described.

In step 601, the processor 502 may determine whether the first housing 210 and the second housing 220 are in an unfolding state by using the at least one sensor (for example, the sensor module 505 of FIG. 5). The unfolding state may include a state in which the first housing 210 and the second housing 220 are adjacent to each other while facing in the same direction.

In step 603, in response to the unfolding state, the processor 502 may set a touch sensitivity of the flexible touch display to a first state. The first state refers to a state in which the touch sensitivity is a high sensitivity.

In step 605, the processor 502 may determine a change of an angle formed by the first housing 210 and the second housing 220 by using the at least one sensor. The electronic device 501 may determine that the angle formed by the first housing 210 and the second housing 220 is being changed, by using the sensor module 505. For example, the user may grip the first housing 210 and the second housing 220 and may change the angle formed by the first housing 210 and the second housing 220. The electronic device 501 may detect the state in which the angle between the first housing and the second housing is being changed by the user. If it is determined that the angle is being changed, the process proceeds to step 607. If it is determined that the angle is not changed, the process returns to step 603.

In step 607, in response to the change of the angle, the processor 502 may change the touch sensitivity of the display 503 from the first state to a second state which is different than the first state. The touch sensitivity of the second state may be a lower sensitivity than the touch sensitivity of the first state. According to an embodiment, in response to it being determined that the angle between the housings is being changed, the electronic device 501 may set the touch sensitivity of the display 503 to the second state. The second state of the touch sensitivity may be maintained while the angle is being changed.

Figure 7:
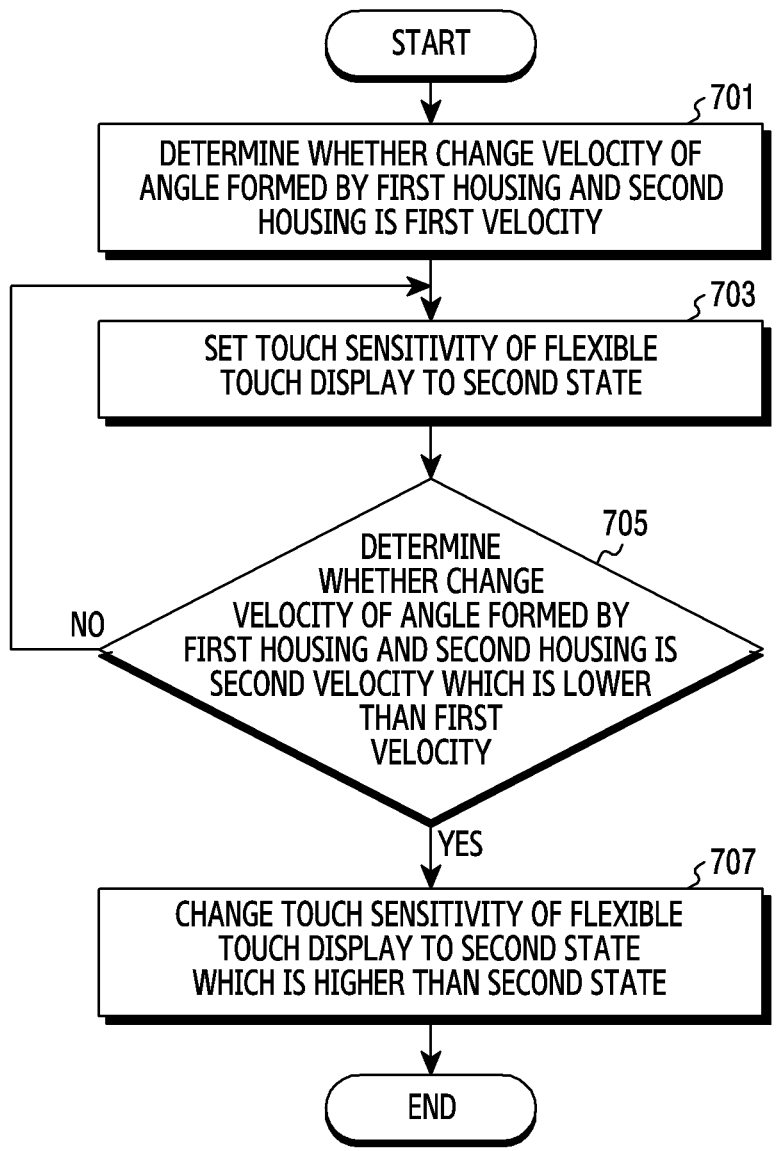
FIG. 7 is a flowchart of a process of changing the touch sensitivity from the second state to the first state according to a change velocity of the angle formed by the first housing and the second housing of the electronic device, according to an embodiment.

FIG. 7 is a flowchart of a process of changing the touch sensitivity from the second state to the first state according to a change velocity of the angle formed by the first housing and the second housing of the electronic device according to an embodiment.

Hereinafter, an operation of the processor 502 changing the touch sensitivity of the display 503 according to a change velocity of the angle formed by the first housing 210 and the second housing 220 of the electronic device 501 will be described.

In step 701, the processor 502 may determine whether a change velocity of the angle formed by the first housing 210 and the second housing 220 is a first velocity by using the at least one sensor (for example, the sensor module 505 of FIG. 5). The first velocity may be a velocity at a time when the angle formed by the first housing 210 and the second housing 220 of the electronic device 501 starts to be changed. For example, when the first housing 210 and the second housing 220 are in a folding start state, the change velocity of the angle formed by the first housing 210 and the second housing 220 may be high.

The processor 502 may detect a slope formed by the first housing 2210 and the second housing 220 by using the gyro sensor. The processor 502 may determine a change of the slope based on the detected slope. The processor 502 may determine the change velocity of the angle formed by the first housing 210 and the second housing 220, based on the change of the slope determined.

In step 703, in response to it being determined that the change velocity of the angle formed by the first housing 210 and the second housing 220 is the first velocity, the processor 502 may set the touch sensitivity of the display 503 to the second state.

In step 705, the processor 502 may determine whether the change velocity of the angle between the first housing 210 and the second housing 220 is a second velocity by using the at least one sensor. The second velocity may be a velocity at a time when the change of the angle formed by the first housing 210 and the second housing 220 of the electronic device 501 ends. The second velocity may be less than the first velocity, such that the second velocity is lower than the first velocity. For example, the change velocity of the angle formed by the first housing 210 and the second housing 220 may be low when the first housing 210 and the second housing 220 are in a state right before folding completion.

If it is determined that the velocity of the angle is being changed, the process proceeds to step 707. If it is determined that the velocity of angle is not changed, the process returns to step 703.

In step 707, in response to it being determined that the change velocity of the angle formed by the first housing 210 and the second housing 220 is the second velocity, the processor 502 may set the touch sensitivity of the display 503 to the first state. The processor 502 may maintain the touch sensitivity before changing to the first state, as the second state. The first state may be a higher sensitivity than the second state.

Figure 8:
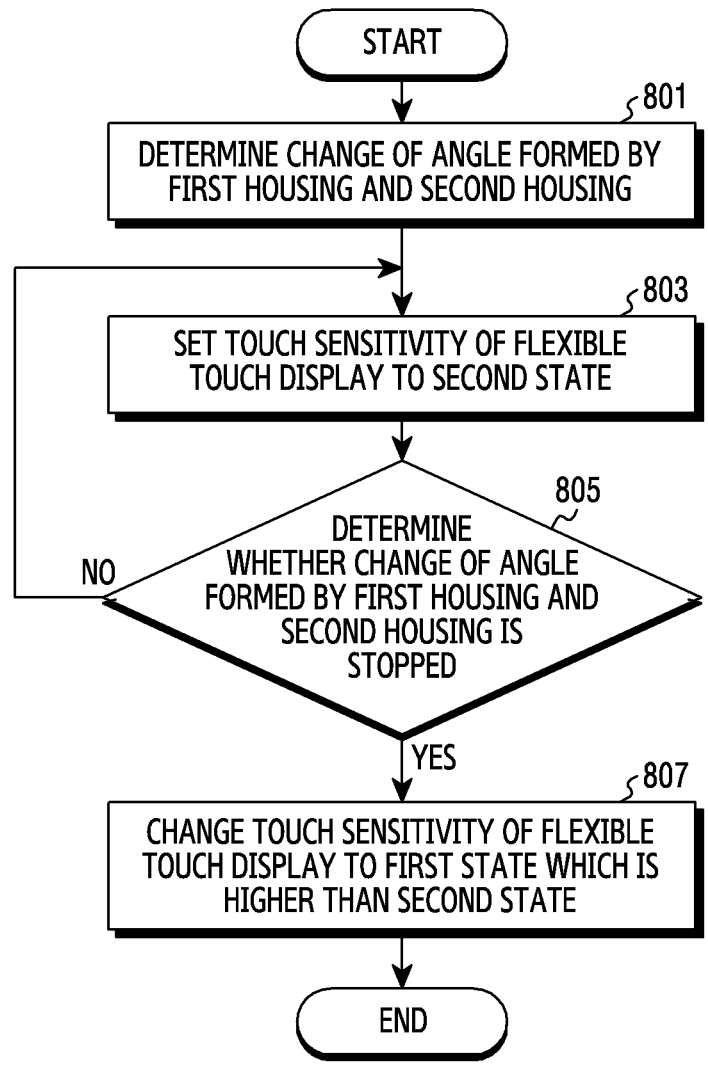
FIG. 8 is a flowchart of a process of changing the touch sensitivity from the second state to the first state according to a stop of the change of the angle formed by the first housing and the second housing of the electronic device, according to an embodiment.

FIG. 8 is a flowchart of a process of changing the touch sensitivity from the second state to the first state according to a stop of the change of the angle formed by the first housing and the second housing of the electronic device according to an embodiment.

Hereinafter, a case where the touch sensitivity of the display 250 changes from the second state to the first state when the folding operation of the first housing 210 and the second housing 220 of the electronic device 501 is stopped will be described. The touch sensitivity of the second state may be a lower sensitivity than the touch sensitivity of the first state.

In step 801, the electronic device 501 may determine a change of the angle formed by the first housing 210 and the second housing 220 by using the at least one sensor (for example, the sensor module 505 of FIG. 5). According to an embodiment, the processor 502 may determine whether the first housing 210 and the second housing 220 are in a folding ongoing state by using the sensor module 505. The folding ongoing state may include a state in which the change of the angle formed by the first housing 210 and the second housing 220 is ongoing.

In step 803, in response to it being determined that the angle formed by the first housing 210 and the second housing 220 is being changed, the electronic device 501 may set the touch sensitivity to the second state. For example, when the first housing 210 and the second housing 220 are in the folding ongoing state, the processor 502 may set the touch sensitivity of the display 250 to the second state.

In step 805, the electronic device 501 may determine whether the change of the angle formed by the first housing 210 and the second housing 220 is stopped. The stop of the change of the angle may include a stop before folding completion or a stop after folding completion. The processor 502 may determine whether the change of the angle formed by the first housing 210 and the second housing 220 is stopped, by using the at least one sensor. When the change of the angle is not stopped, the process returns to step 803. For example, the processor 502 may maintain the touch sensitivity of the flexible touch display as the second state.

When the change of the angle is stopped, the process proceeds to step 807.

In step 807, in response to the stop of the change of the angle, the electronic device 501 may change the touch sensitivity of the second state corresponding to the folding ongoing state to the first state.

Figure 9:
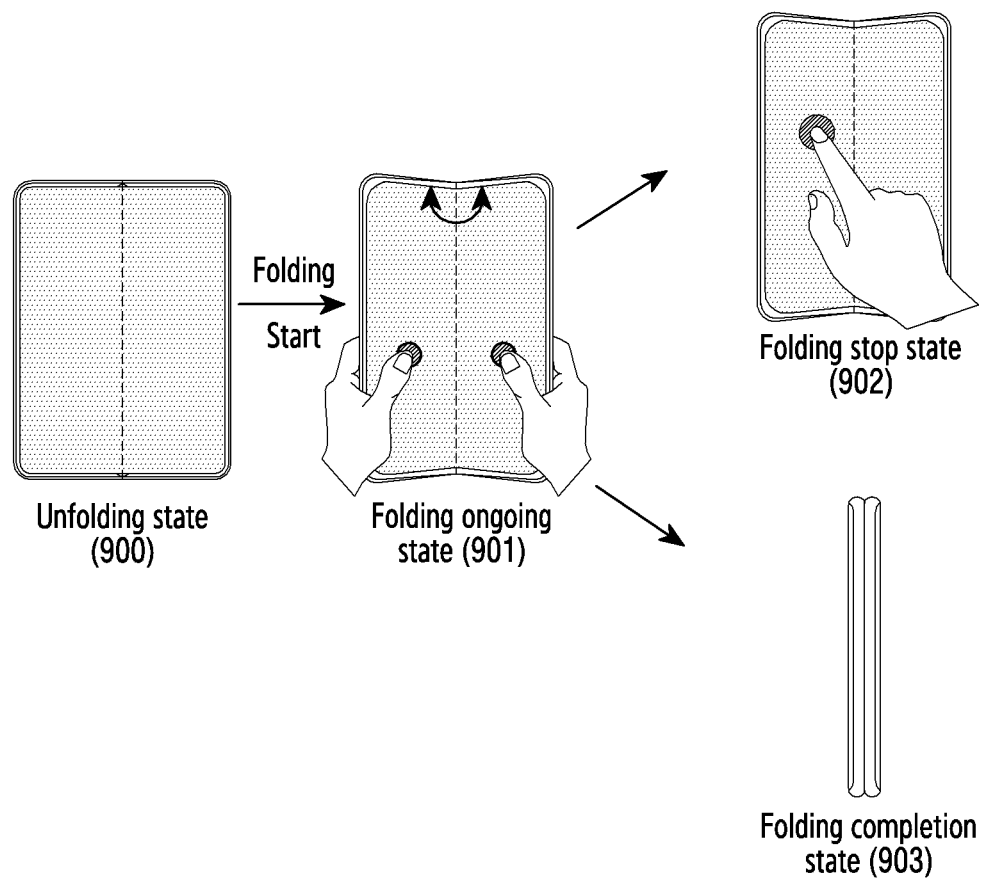
FIG. 9 illustrates a process in which the touch sensitivity is changed according to a change of the angle formed by the first housing and the second housing of the electronic device, according to an embodiment.

FIG. 9 illustrates a process in which a touch sensitivity is changed according to a change of an angle formed by the first housing and the second housing of the electronic device according to an embodiment.

When a folding operation starts, the electronic device 501 may change the touch sensitivity of the display 250 from the first state to the second state.

When the folding operation is stopped in a folding ongoing state 901, the electronic device 501 may change the touch sensitivity from the second state to the first state.

Hereinafter, respective steps will be described in detail.

In operation 900, the processor 502 may determine whether the first housing 210 and the second housing 220 are in an unfolding state 900 by using the at least one sensor (for example, the sensor module 505 of FIG. 5). In the unfolding state 900, the processor 502 may set the touch sensitivity of the display 503 to the first state.

In operation 901, the processor 502 may determine whether the first housing 210 and the second housing 220 are in the folding ongoing state 901 by using the sensor module 505. In the folding ongoing state 901, the processor 502 may set the touch sensitivity of the display 503 to the second state. In response to the change from the unfolding state 900 to the folding ongoing state 901, the electronic device 501 may change the touch sensitivity from the first state to the second state. While the folding ongoing state 901 is being maintained, the electronic device 501 may maintain the touch sensitivity as the second state.

In operation 902, the processor 502 may determine whether the first housing 210 and the second housing 220 are in a folding stop state 902 by using the at least one sensor. The folding stop state 902 may include a case where the change of the angle is stopped when the first housing 210 and the second housing 220 form a predetermined angle. For example, the folding stop state 902 may include an intermediate state where the first housing 210 and the second housing 220 form a predetermined angle. In response to the change from the folding ongoing state 901 to the folding stop state 902, the electronic device 501 may change the touch sensitivity from the second state to the first state.

In operation 903, the processor 502 may determine whether the first housing 210 and the second housing 220 are in a folding completion state 903 by using the at least one sensor. The folding completion state 903 may include a state in which at least a portion of one surface of the first housing 210 and at least a portion of one surface of the second housing 220 are in contact with each other. The folding completion state 903 may include a case where the electronic device 501 is in a folded state (for example, a fully folded state). In response to the change from the folding ongoing state 901 to the folding completion state 903, the electronic device 501 may change the touch sensitivity from the second state to the first state.

Figure 10:
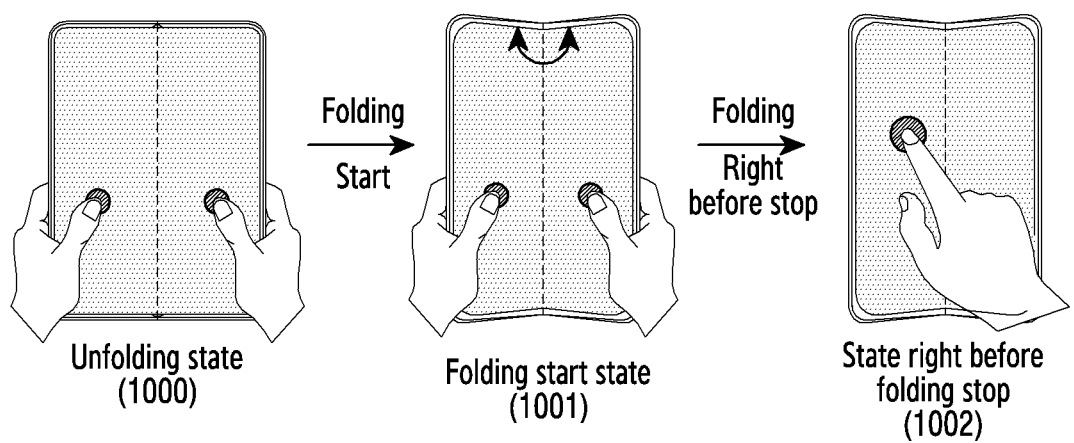
FIG. 10 illustrates a process in which the touch sensitivity is changed according to a change velocity of the angle formed by the first housing and the second housing of the electronic device, according to an embodiment.

FIG. 10 illustrates a process in which the touch sensitivity is changed according to a change velocity of the angle formed by the first housing and the second housing of the electronic device according to an embodiment.

In a folding start state 1001, the electronic device 501 may set the touch sensitivity to the second state.

According to an embodiment, in a state 1002 right before a folding stop, the electronic device 501 may set the touch sensitivity to the first state.

Hereinafter, respective steps will be described in detail.

In operation 1000, the processor 502 may determine an unfolding state 1000 by using the at least one sensor (for example, the sensor module 505 of FIG. 5). The processor 502 may set the touch sensitivity of the display 503 to the first state based on the determined unfolding state 1000.

In operation 1001, the processor 502 may determine a change velocity of the angle formed by the first housing 210 and the second housing 220 by using the at least one sensor. In the folding start state 1001, the processor 502 may determine the change velocity of the angle to the first velocity. In response to the determined first velocity, the processor 502 may set the touch sensitivity of the display 250 to the second state. From the folding start state 1001 to the state 1002 right before the folding stop, the electronic device 501 may maintain the touch sensitivity as the second state.

The change velocity of the angle between the first housing 210 and the second housing 220 in the folding start state 1001 may be higher than a change velocity of the angle in the state 1002 right before the folding stop.

In operation 1002, the state 1002 right before the folding stop may include a state right before the change of the angle is stopped while the first housing 210 and the second housing 220 form a predetermined angle. According to another embodiment, the state 1002 right before the folding stop may include a state right before the first housing 210 and the second housing 220 are in a fully folded state and the change of the angle is stopped. In the state 1002 right before the folding stop, the processor 502 may determine the change velocity of the angle as the second velocity. The processor 502 may set the touch sensitivity of the display 503 to the first state in response to the second velocity.

In response to the change from the folding start state 1001 to the state 1002 right before the folding stop, the electronic device 501 may change the touch sensitivity from the second state to the first state. While the folding stop state is being maintained after the state 1002 right before the folding stop, the electronic device 501 may maintain the touch sensitivity as the first state.

The change velocity of the angle between the first housing 210 and the second housing 220 in the state 1002 right before the folding stop may be lower than the change velocity of the angle in the folding start state 1001.

Figure 11:
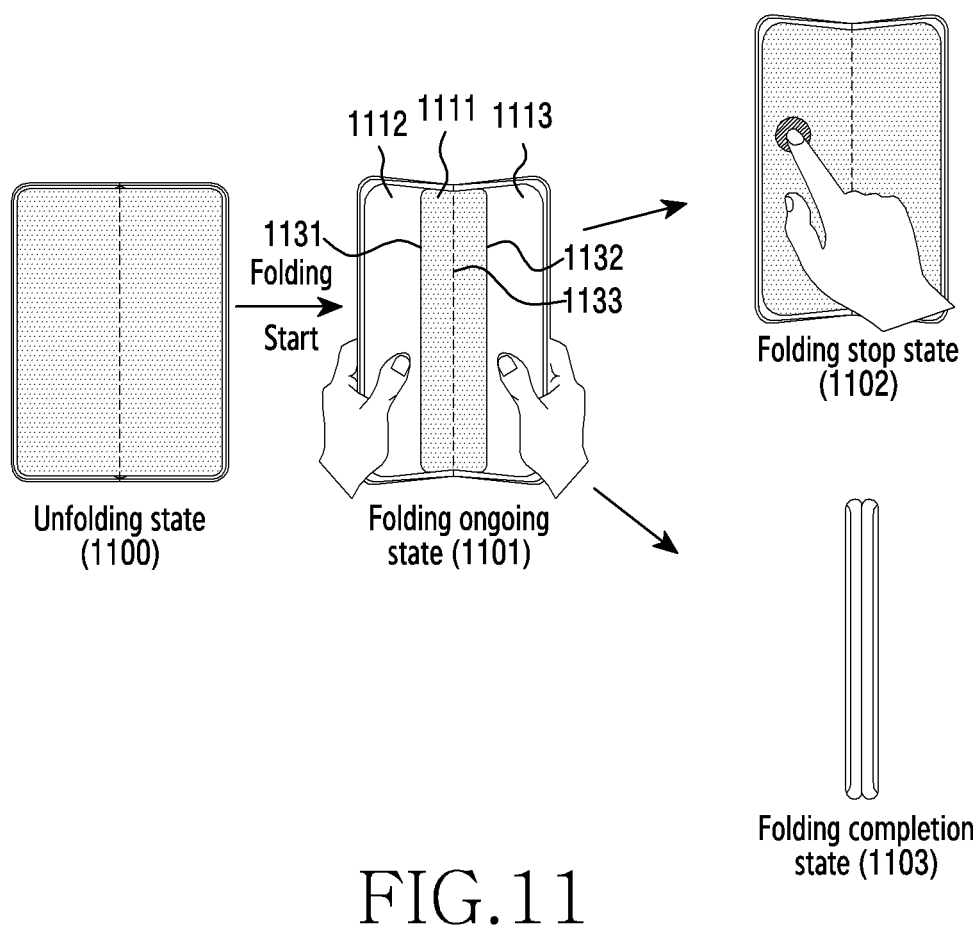
FIG. 11 illustrates a touch limited area of a first form which is changed according to a change of the angle formed by the first housing and the second housing of the electronic device, according to an embodiment.

FIG. 11 illustrates a touch limited area of a first form which changes according to a change of an angle formed by the first housing and the second housing of the electronic device according to an embodiment.

The display 503 may include the touch limited area of the first form which changes according to a change of the angle formed by the first housing 210 and the second housing 220 on at least some areas of the display 503.

The display 503 may display a visual effect indicating the touch limited area of the first form which changes according to a change of the angle formed by the first housing 210 and the second housing 220 on at least some areas of the display 503.

According to an embodiment, in response to a change of a touch sensitivity area of the first state and the second state, the electronic device 501 may change the visual effect.

In operation 1100, the processor 502 may set the touch sensitivity of the display 503 to the first state in an unfolding state 1100. The electronic device 501 may display a visual effect corresponding to the first state on at least a portion of the display 503. For example, the visual effect indicating the first state may include displaying the full area of the display 503 as a touch sensitive area.

In operation 1101, the processor 502 may determine whether the first housing 210 and the second housing 220 are in a folding ongoing state 1101 by using at least one sensor (for example, the sensor module 505 of FIG. 5).

In response to the determined folding ongoing state 1101, the processor 502 may set the touch sensitivity of at least some areas of the display 503 to the second state.

In response to the change from the unfolding state 1100 to the folding ongoing state 1101, the electronic device 501 may change the touch sensitivity of the at least some areas of the display 503 from the first state to the second state. The electronic device 501 may display a visual effect corresponding to the second state on at least some areas of the display 503.

In response to the change of the touch sensitivity of the first state and the second state, the electronic device 501 may change the visual effect corresponding to the first state and the second state.

The electronic device 501 may display the visual effect corresponding to the first state on a first area 1111, and may display the visual effect corresponding to the second state on a second area 1112 and a third area 1113.

During the folding ongoing state 1101, the electronic device 501 may change a size of the area showing the visual effect corresponding to the second state, and a size of the area showing the visual effect corresponding to the first state.

The visual effect indicating the touch sensitivity of the second state may be displayed on the touch limited area of the first form. The touch limited area may include at least one of an area where the touch sensitivity is a low sensitivity or a touch insensitive area. The touch insensitive area may include an area where the touch function of the display 503 is turned off.

In the folding ongoing state 1101, the display 503 may include the first area 1111, the second area 1112, and the third area 1113. The first area 1111 may include a touch sensitive area or a high touch sensitivity area. The second area 1112 and the third area 1113 may include the touch limited area. The sizes of the second area 1112 and the third area 1113 may be the same or may be different from each other. The first area 1111 may include a first line 1131, a second line 1132, and a third line 1133.

In response to the angle formed by the first housing 210 and the second housing 220 being changed, the electronic device 501 may change the sizes of the first area 1111, the second area 1112, and the third area 1113. In response to the angle being reduced, the first line 1131 and the second line 1132 may move in parallel toward the third line 1133, and the size of the first area 1111 may be reduced. In response to the size of the first area 1111 being reduced according to the change of the angle, the electronic device 501 may reduce the area of the visual effect corresponding to the first state.

In response to the angle being reduced, the first line 1131 and the second line 1132 may move in parallel toward the third line 1133, and the sizes of the second area 1112 and the third area 1113 may increase. In response to the sizes of the second area 1112 and the third area 1113 increasing according to the change of the angle, the electronic device 501 may increase the area displaying the visual effect corresponding to the second state.

In operation 1102, the electronic device 501 may determine a folding stop state 1102 by using the at least one sensor module 505.

In the folding stop state 1102, the electronic device 501 may remove the touch limited area of the first form from the display. For example, in the folding stop state 1102, the electronic device 501 may display the visual effect of the first area 1111 corresponding to the first state on the full area of the display 503.

In a folding completion state 1103, the electronic device 501 may remove the touch limited area of the first form from the display. For example, in the folding completion state 1103, the electronic device 501 may display the visual effect of the first area 1111 corresponding to the first state on the full area of the display 503. According to another embodiment, in the folding completion state 1103, the electronic device 501 may display the visual effect corresponding to the first state through the display positioned on the rear cover.

The touch limited area may have a certain form, as explained with reference to FIGS. 12 and 13.

Figure 12:
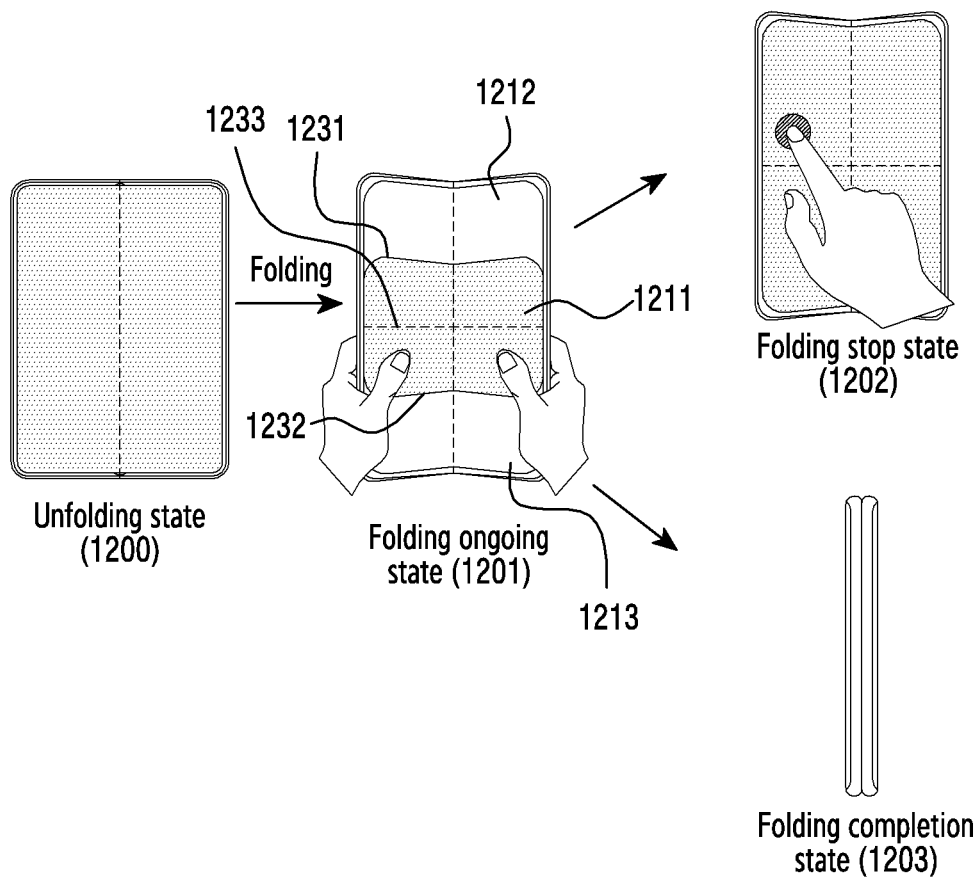
FIG. 12 illustrates a touch limited area of a second form which is changed according to a change of the angle formed by the first housing and the second housing of the electronic device, according to an embodiment.

FIG. 12 illustrates a touch limited area of a second form which changes according to a change of the angle formed by the first housing and the second housing of the electronic device, according to an embodiment.

The display 503 may include the touch limited area of the second form which changes according to a change of the angle formed by the first housing 210 and the second housing 220 on at least some areas of the display 503.

The display 503 may display a visual effect indicating the touch limited area of the second form which changes according to a change of the angle formed by the first housing 210 and the second housing 220 on at least some areas of the display 503.

In an unfolding state 1200, the processor 502 may set the touch sensitivity of the display 503 to the first state. The electronic device 501 may display a visual effect corresponding to the first state on at least a portion of the display 503. For example, the visual effect indicating the first state may include displaying the full area of the display 250 as a touch sensitive area.

The processor 502 may determine whether the first housing 210 and the second housing 220 are in a folding ongoing state 1201 by using at least one sensor (for example, the sensor module 505 of FIG. 5).

In response to the determined folding ongoing state 1201, the processor 502 may change the touch sensitivity of the display 503 from the first state to the second state. The electronic device 501 may display a visual effect corresponding to the second state on at least some areas of the display 503. The visual effect indicating the touch sensitivity of the second state may be displayed on the touch limited area of the second form. The touch limited area may include at least one of an area where the touch sensitivity is a low sensitivity or a touch insensitive area. The touch insensitive area may include an area where the touch function of the display 503 is turned off.

The display in the folding ongoing state 1201 may include a first area 1211, a second area 1212, and a third area 1213. The first area 1211 may include a touch sensitive area or a high touch sensitivity area. The second area 1212 and the third area 1213 may include the touch limited area. The first area 1211 may include a first line 1231, a second line 1232, and a third line 1233. The third line 1233 may be positioned on the center between the first line 1231 and the second line 1232.

In response to the angle formed by the first housing 210 and the second housing 220 being changed, the electronic device 501 may change sizes of the first area 1211, the second area 1212, and the third area 1213. In response to the angle being reduced, the first line 1231 and the second line 1232 move in parallel toward the third line 1233, and the size of the first area 1211 may be reduced. In response to the size of the first area 1211 being reduced according to the change of the angle, the electronic device 501 may reduce the area displaying the visual effect corresponding to the first state.

In response to the size of the first area 1211 being reduced, the sizes of the second area 1212 and the third area 1213 may increase. In response to the sizes of the second area 1212 and the third area 1213 increasing according to the change of the angle, the electronic device 501 may increase the area displaying the visual effect corresponding to the second state.

The sizes of the second area 1212 and the third area 1213 may be the same or may be different from each other.

In a folding stop state 1202 or a folding completion state 1203, the touch limited area of the second form may be removed from the display.

Figure 13:
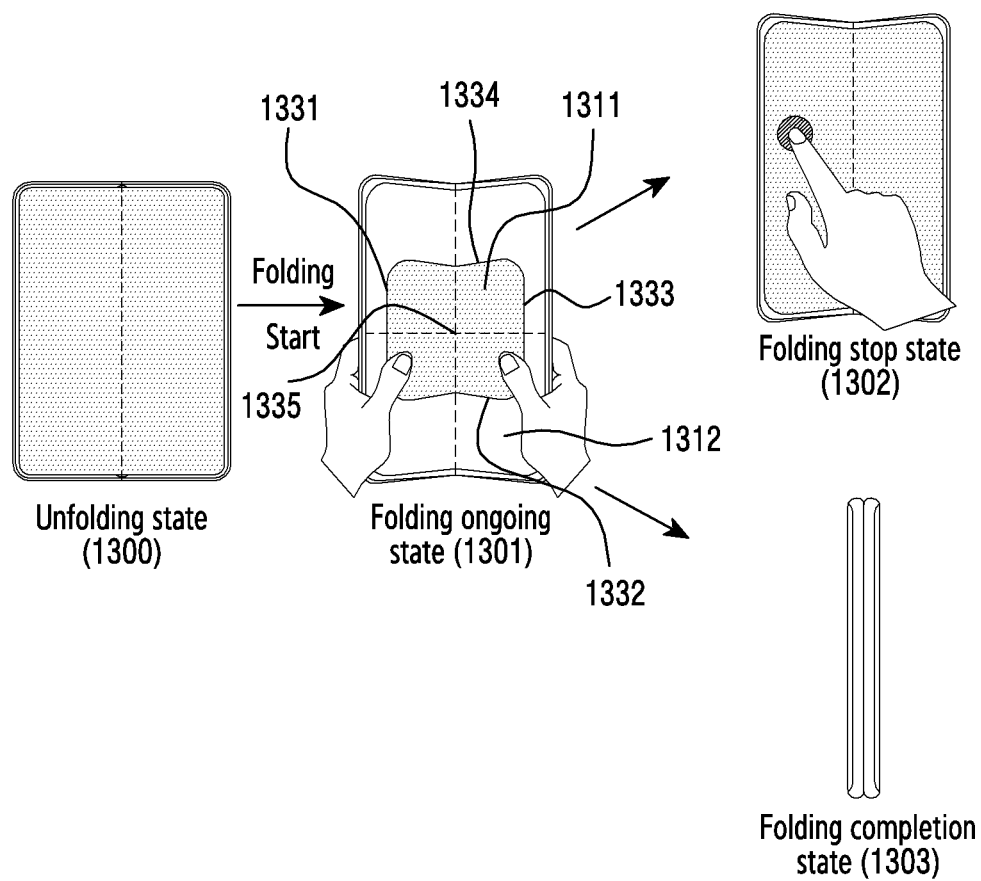
FIG. 13 illustrates a touch limited area of a third form which is changed according to a change of the angle formed by the first housing and the second housing of the electronic device, according to an embodiment.

FIG. 13 illustrates a touch limited area of a third form which changes according to a change of the angle formed by the first housing and the second housing of the electronic device according to an embodiment.

The display 503 may include the touch limited area of the third form which changes according to a change of the angle formed by the first housing 210 and the second housing 220.

The display 503 may display a visual effect indicating the touch limited area of the third form which changes according to a change of the angle formed by the first housing 210 and the second housing 220.

The processor 502 may set the touch sensitivity of the display 503 to the first state in an unfolding state 1300. The electronic device 501 may display a visual effect corresponding to the first state on at least a portion of the display 503. For example, the visual effect indicating the first state may include displaying the full area of the display 503 as a touch sensitive area.

The processor 502 may determine whether the first housing 210 and the second housing 220 are in a folding ongoing state 1301 by using at least one sensor (for example, the sensor module 505 of FIG. 5).

In response to the determined folding ongoing state 1301, the processor 502 may change the touch sensitivity of the display 503 from the first state to the second state. The electronic device 501 may display a visual effect corresponding to the second state on at least some areas of the display 503. The visual effect indicating the touch sensitivity of the second state may be displayed on the touch limited area of the third form. The touch limited area may include at least one of an area where the touch sensitivity is a low sensitivity or a touch insensitive area. The touch insensitive area may include an area where the touch function of the display 503 is turned off.

The display in the folding ongoing state 1301 may include a first area 1311 and a second area 1312. The first area 1311 may include a touch sensitive area or a high touch sensitivity area. The second area 1312 may include the touch limited area. The first area 1311 may include a first line 1331, a second line 1332, a third line 1333, a fourth line 1334, and a center point 1335.

In response to the angle formed by the first housing 210 and the second housing 220 being changed, the electronic device 501 may change sizes of the first area 1311 and the second area 1312. In response to the angle being reduced, the first line 1331, the second line 1332, the third line 1333, and the fourth line 1334 may move in parallel toward the center point 1335 simultaneously, and the size of the first area 1311 may be reduced. In response to the size of the first area 1311 being reduced according to the change of the angle, the electronic device 501 may reduce the area displaying the visual effect corresponding to the first state.

In response to the size of the first area 1311 being reduced, the size of the second area 1312 may increase. In response to the size of the second area 1312 increasing according to the change of the angle, the electronic device 501 may increase the area displaying the visual effect corresponding to the second state.

In a folding stop state 1302 or a folding completion state 1303, the touch limited area of the third form may be removed from the display.

Figure 14A:
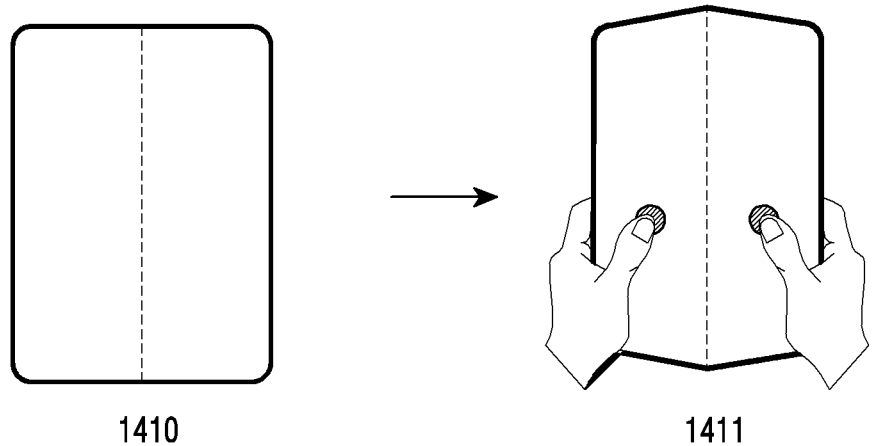
FIG. 14A illustrates a case where the electronic device is an out-folding device, according to an embodiment.
Figure 14B:
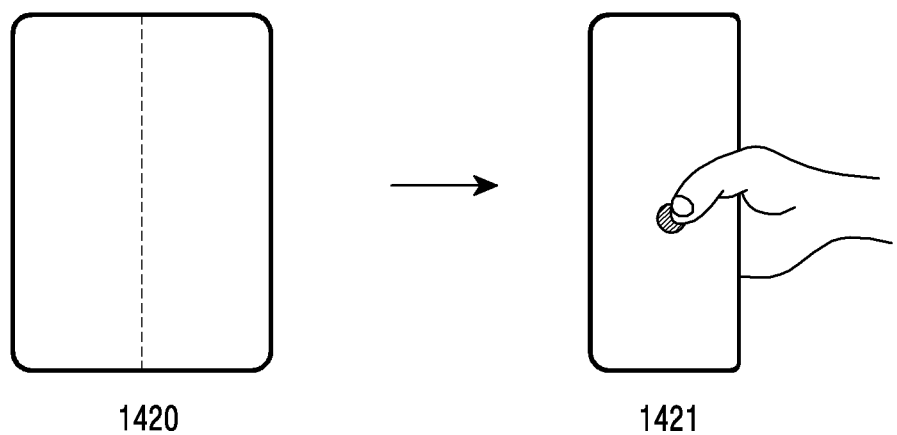
FIG. 14B illustrates a case where the electronic device is an out-folding device, according to an embodiment.

FIGS. 14A and 14B illustrate a case where the electronic device 501 is an out-folding device. Details of the block diagrams of the electronic device 101 of FIG. 1 and the electronic device 501 of FIG. 5 may be applied to the electronic device 1410, 1411, 1420, 1421 of FIGS. 14A and 14B. The functions related to the in-folding foldable device corresponding to FIGS. 1-13 may be applied to the out-folding foldable device corresponding to FIGS. 14A and 14B.

FIG. 14A illustrates an operation of changing from an unfolding state to a folding ongoing state or a folding completion state while the first housing 210 and the second housing 220 of the electronic device 501 are out-folded.

The electronic device 1410 may be in the unfolding state. The electronic device 1411 may be in a folding ongoing state while the first housing 210 and the second housing 220 of the electronic device 1411 are forming a predetermined angle. The electronic device 1411 may be in a folding completion state while the first housing 210 and the second housing 220 of the electronic device 1411 are forming a predetermined angle.

FIG. 14B illustrates an operation of changing from the unfolding state to a fully folded state while the first housing 210 and the second housing 220 of the electronic device 501 are out-folded. The fully folded state may be the folding completion state.

The electronic device 1420 may be in a state where the first housing 210 and the second housing 220 are unfolded. The electronic device 1421 may be in a state where the first housing 210 and the second housing 220 are fully folded.

In response to the change of the angle formed by the first housing 210 and the second housing 220 of the electronic device 501 being ongoing, the electronic device 501 may change the touch sensitivity of the display 503 from the first state to the second state.

In response to the change of the angle formed by the first housing 210 and the second housing 220 of the electronic device 501 being stopped, the electronic device 501 may change the touch sensitivity from the second state to the first state.

In response to a change velocity of the angle formed by the first housing 210 and the second housing 220 of the electronic device 501, the electronic device 501 may change the touch sensitivity of the display 503 from the second state to the first state.

In response to the change of the angle formed by the first housing 210 and the second housing 220 of the electronic device 501 or the change velocity of the angle, the electronic device 501 may change the touch sensitivity of the display 503 from the first state to the second state. The electronic device 501 may display visual effects indicating the first state and the second state on at least a portion of the display 503. In response to the change of the angle formed by the first housing 210 and the second housing 220 of the electronic device 501 or the change velocity of the angle, the electronic device 501 may change the visual effects indicating the first state and the second state, respectively.

According to various embodiments disclosed herein, there are provided various methods and apparatuses for preventing touch malfunction of a foldable device. Through the various methods and apparatuses, touch malfunction that users do not intend can be prevented and controlled. Accordingly, the method and the apparatus can enhance utility and convenience for users using foldable devices.

In addition, various effects that can directly or indirectly be grasped through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a first housing and a second housing adjacent to the first housing;
   a hinge unit configured to connect the first housing and the second housing;
   a flexible touch display disposed across the first housing and the second housing;
   at least one sensor configured to detect an angle formed by the first housing and the second housing;
   a processor operatively connected with the flexible touch display and the at least one sensor; and
   a memory operatively connected with the processor,
   wherein the memory stores instructions which, when executed, cause the processor to:
   determine whether the first housing and the second housing are in an unfolding state by using the at least one sensor;
   when the first housing and the second housing are in the unfolding state, set a touch sensitivity of the flexible touch display to a first state;
   determine a change of the angle formed by the first housing and the second housing by using the at least one sensor; and
   when the angle is being changed, change the touch sensitivity of the flexible touch display to a second state which is lower than the first state.

2. The foldable electronic device of claim 1, wherein the at least one sensor comprises at least one of a Hall sensor, a gyro sensor, an angle sensor, or an acceleration sensor.

3. The foldable electronic device of claim 1, wherein the instructions, when executed, further cause the processor to:
   determine a change velocity of the angle formed by the first housing and the second housing by using the at least one sensor;
   when the change velocity is a first velocity, set the touch sensitivity of the flexible touch display to the second state; and
   when the change velocity is a second velocity which is lower than the first velocity, change the touch sensitivity of the touch display to the first state which is higher than the second state.

4. The foldable electronic device of claim 1, wherein the instructions, when executed, further cause the processor to:
   determine whether the change of the angle formed by the first housing and the second housing is stopped by using the at least one sensor; and
   in response to the change of the angle being stopped, change the touch sensitivity of the flexible touch display from the second state to the first state.

5. The foldable electronic device of claim 4, wherein the instructions, when executed, further cause the processor to, in response to the change from the second state to the first state, display a visual effect corresponding to the first state on at least a portion of the flexible touch display.

6. The foldable electronic device of claim 1, wherein the instructions, when executed, further cause the processor to:

determine whether the first housing and the second housing are in a folding completion state by using the at least one sensor; and in response to the folding completion state, change the touch sensitivity of the flexible touch display from the second state to the first state.

7. The foldable electronic device of claim 1, wherein the instructions, when executed, further cause the processor to, in response to the change from the first state to the second state, display a visual effect corresponding to the second state in at least a portion of the flexible touch display.

8. The foldable electronic device of claim 7, wherein the instructions, when executed, further cause the processor to:

display the visual effect corresponding to the touch sensitivity of the second state on a second area of the flexible touch display; and display a visual effect corresponding to the touch sensitivity of the first state on a first area except for the second area of the touch display.

9. A method for controlling of a foldable electronic device, the method comprising:

determining, by a processor, whether a first housing and a second housing are in an unfolding state by using at least one sensor of the foldable electronic device;

when in the unfolding state, setting, by the processor, a touch sensitivity of a flexible touch display to a first state;

determining, by the processor, a change of the angle formed by the first housing and the second housing by using the at least one sensor; and when the angle is being changed, changing, by the processor, the touch sensitivity of the flexible touch display to a second state which is lower than the first state.

10. The method of claim 9, further comprising:

determining, by the processor, a change velocity of the angle formed by the first housing and the second housing by using the at least one sensor;

when the change velocity is a first velocity, setting, by the processor, the touch sensitivity of the flexible touch display to the second state; and when the change velocity is a second velocity which is lower than the first velocity, changing, by the processor, the touch sensitivity of the flexible touch display to the first state which is higher than the second state.

11. The method of claim 9, further comprising:

determining, by the processor, whether the change of the angle formed by the first housing and the second housing is stopped by using the at least one sensor; and in response to the change of the angle being stopped, changing, by the processor, the touch sensitivity of the flexible touch display from the second state to the first state.

12. The method of claim 11, further comprising, in response to the change from the second state to the first state, displaying, by the processor, a visual effect corresponding to the first state on at least a portion of the flexible touch display.

13. The method of claim 9, further comprising:

determining, by the processor, whether the first housing and the second housing are in a folding completion state by using the at least one sensor; and in response to the folding completion state, changing, by the processor, the touch sensitivity of the flexible touch display from the second state to the first state.

14. The method of claim 9, further comprising, in response to the change from the first state to the second state, displaying, by the processor, a visual effect corresponding to the second state in at least a portion of the flexible touch display.

15. The method of claim 14, further comprising:

displaying, by the processor, the visual effect corresponding to the touch sensitivity of the second state on a second area of the flexible touch display; and displaying, by the processor, a visual effect corresponding to the touch sensitivity of the first state on a first area except for the second area of the touch display.

16. A non-transitory recording medium which stores computable-readable instructions, which, when executed by at least one processor of a foldable electronic device in which the instructions are stored, are configured to perform:

determining, by the processor, whether a first housing and a second housing are in an unfolding state by using at least one sensor of the foldable electronic device;

when in the unfolding state, setting, by the processor, a touch sensitivity of a flexible touch display to a first state;

determining, by the processor, a change of the angle formed by the first housing and the second housing by using the at least one sensor; and when the angle is being changed, changing, by the processor, the touch sensitivity of the flexible touch display to a second state which is lower than the first state.

* * * * *